United States Patent
Xia et al.

(10) Patent No.: US 9,867,225 B2
(45) Date of Patent: Jan. 9, 2018

(54) METHOD AND NODES FOR HANDLING A FAILURE IN A COMMUNICATIONS NETWORK

(71) Applicant: TELEFONAKTIEBOLAGET L M ERICSSON (PUBL), Stockholm (SE)

(72) Inventors: Qi Xia, Shanghai (CN); Yong Yang, Kållered (SE); Dongmei Zhu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 83 days.

(21) Appl. No.: 14/784,461

(22) PCT Filed: Apr. 15, 2014

(86) PCT No.: PCT/CN2014/075405
§ 371 (c)(1),
(2) Date: Oct. 14, 2015

(87) PCT Pub. No.: WO2014/169811
PCT Pub. Date: Oct. 23, 2014

(65) Prior Publication Data
US 2016/0057801 A1    Feb. 25, 2016

Related U.S. Application Data

(60) Provisional application No. 61/812,280, filed on Apr. 16, 2013.

(51) Int. Cl.
*H04L 1/00* (2006.01)
*H04W 76/02* (2009.01)
(Continued)

(52) U.S. Cl.
CPC ......... *H04W 76/027* (2013.01); *H04L 12/189* (2013.01); *H04W 24/04* (2013.01); *H04W 72/005* (2013.01); *H04W 88/14* (2013.01)

(58) Field of Classification Search
CPC . H04W 76/027; H04W 72/005; H04W 24/04; H04W 88/14; H04L 12/189
See application file for complete search history.

(56) References Cited

U.S. PATENT DOCUMENTS

2007/0275742 A1* 11/2007 Zhang .................. H04L 12/189
455/466
2007/0281686 A1* 12/2007 Liu ........................ H04W 8/20
455/433
(Continued)

FOREIGN PATENT DOCUMENTS

| CN | 1859698 A | 11/2006 |
| CN | 101437222 A | 5/2009 |
| CN | 102932855 A | 2/2013 |

OTHER PUBLICATIONS

International Search Report and Written Opinion dated Jul. 24, 2014, in International Application No. PCT/CN2014/075405, 13 pages.
(Continued)

*Primary Examiner* — Clemence Han
(74) *Attorney, Agent, or Firm* — Rothwell, Figg, Ernst & Manbeck, P.C.

(57) ABSTRACT

The embodiments herein relate to a method in a second CN node (205,407) for handling a failure in a communications network (200). The failure has caused communication between the second CN node (205, 407) and an old first CN node (203a) to become unavailable. The communication is associated with a session. When the failure has been detected, the second CN node transmits a session start request message to a new first CN node (203b, 405b, 410b). The session start request is a request to restore the session. The session start request message comprises a restoration flag indicating restoration of the session for a same service established before the failure and allowing a RAN node
(Continued)

(201, 403) in the communications network (200) to accept the session start request message.

49 Claims, 11 Drawing Sheets

(51) Int. Cl.
| | |
|---|---|
| *H04W 24/04* | (2009.01) |
| *H04L 12/18* | (2006.01) |
| *H04W 72/00* | (2009.01) |
| *H04W 88/14* | (2009.01) |

(56) References Cited

U.S. PATENT DOCUMENTS

2014/0192701 A1* 7/2014 Drevo .................... H04W 4/06
 370/312
2015/0146630 A1* 5/2015 Luo ...................... H04W 16/14
 370/329
2015/0230063 A1* 8/2015 Chandramouli ...... H04W 4/005
 455/466

OTHER PUBLICATIONS

Alcatel-Lucent et al. "MBMS Session Start Request received for an on-going MBMS bearer service" 3GPP TSG CT WG4 Meeting #61, C4-131406, 2013, 5 pages.

Alcatel-Lucent et al. "New MBMS flags for eMBMS restoration" 3GPP TSG CT WG4 Meeting #61, C4-131412, 2013, 9 pages.

Alcatel-Lucent "Restoration of eMGMS Bearer Services and logical M3 Connections in MCE" 3GPP TSG-RAN WG3 Meeting #83, R3-140493, 2014, 16 pages.

3GPP, 3rd Generation Partnership Project; Technical Specification Group Services and System Aspects; Multimedia Broadcast/Multicast Service (MBMS); Architecture and functional description (Release 11), 3GPP TS 23.246 V11.0.0, 2012, 66 pages.

* cited by examiner

METHOD AND NODES FOR HANDLING A FAILURE IN A COMMUNICATIONS NETWORK

CROSS REFERENCE TO RELATED APPLICATION(S)

This application is a 35 U.S.C. §371 National Phase Entry Application from PCT/CN2014/075405, filed Apr. 15, 2014, designating the United States, and also claims the benefit of U.S. Provisional Application No. 61/812,280, filed Apr. 16, 2013. The disclosures of both applications are incorporated herein in their entirety by reference.

TECHNICAL FIELD

Embodiments herein relate generally to an old first Core Network (CN) node, a method in the old first CN node, a new first CN node, a method in the new first CN node, a second CN node, a method in the second CN node, a Radio Access Network (RAN) node and a method in the RAN node. More particularly, the embodiments herein relate to handling a failure in a communications network.

BACKGROUND

In a typical communications network a wireless device, communicates via a RAN to one or more CNs. The communications network may also be referred to as e.g. a wireless communications network, a wireless communications system, a communications network, a communications system, a network or a system.

The wireless device may be a device by which a subscriber may access services offered by an operator's network and services outside operator's network to which the operator's RAN and CN provide access, e.g. access to the Internet. The wireless device may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The wireless device may be portable, pocket storable, hand held, computer comprised, or vehicle mounted devices, enabled to communicate voice and/or data, via the radio access network, with another entity, such as another wireless device or a server.

The RAN covers a geographical area which is divided into cell areas, with each cell area being served by a RAN node. The RAN node may be called a base station such as a Radio Base Station (RBS), evolved NodeB (eNB), NodeB, B node, Radio Network Controller (RNC), Base Station Controller (BSC), Base Transceiver Station (BTS), depending on the technology and terminology used. A cell is a geographical area where radio coverage is provided by the RAN node at a RAN node site. The RAN node communicates with the wireless device(s) within range of the RAN node.

According to the Third Generation Partnership Project (3GPP), Multimedia Broadcast Multicast Services (MBMS) "is a point-to-multipoint service in which data is transmitted from a single source entity to multiple recipients. Transmitting the same data to multiple recipients allows network resources to be shared." MBMS offers two modes: broadcast mode and multicast mode. The MBMS architecture enables the efficient usage of radio network and core network resources. evolved MBMS (eMBMS) may be described as the Long Term Evolution (LTE) version of MBMS. The eMBMS evolution brings improved performance thanks to higher and more flexible LTE bit rates, single frequency network operations, and carrier configuration flexibility.

In MBMS, there are some network nodes or functional entities which are important. Multi-cell/multicast Coordination Entity (MCE) is a network node or functional entity which is responsible for allocation of time and frequency resources for MBMS transmission. The MCE may be co-located with for example an eNB. Another network node is the MBMS-GateWay (MBMS-GW), which is the entry point for incoming broadcast/multicast data traffic. The MBMS-GW broadcasts data packets to all eNBs within an area. Broadcast Multicast-Service Centre (BM-SC) is a network node or functional entity which is necessary in order for a communications network to support MBMS. The BM-SC is in charge of providing service to the end user.

Some of the reference points in MBMS are Sn, SGmb and Sm. Sn is the reference point for the control plane between the MBMS-GW and a Serving General packet radio service Support Node (SGSN). SGmb is the reference point for the control plane between BM-SC and the MBMS-GW. Sm is the reference point for the control plane between the Mobility Management Entity (MME) and the MBMS-GW. M3 Application Protocol (M3AP) supports the M3 interface which is between the MCE and the MBMS-GW. A reference point may also be referred to as an interface. Signaling between nodes is exchanged at a reference point.

The purpose of a MBMS Session Start procedure is to request the RAN to notify wireless devices about an upcoming MBMS Session of a given MBMS Bearer Service and to establish a MBMS Radio Access Bearer (RAB) and MBMS signalling connection for this MBMS Session. The MBMS Session Start procedure is triggered by the CN. For example, the CN initiates the procedure by sending a MBMS Session Start request message to the RNC. The MBMS Session Start request message comprises different parameters. The RNC acts according to the received MBMS Session Start request message. The RNC sends a MBMS Session Start response message or a MBMS Session Start failure message to the core network, depending on the outcome of the procedure.

According to 3GPP, data stored in location registers are automatically updated in normal operation. The main information stored in a location register defines the location of each wireless device and the subscriber data required to handle traffic for each mobile subscriber. The loss or corruption of these data will seriously degrade the service offered to wireless device subscribers. It is therefore necessary to define procedures to limit the effects of failure of a location register, and to restore the location register data automatically. Such restoration procedures are related to failure and/or restart of several types of network nodes and network paths/interfaces, such as e.g. MBMS-GW, MME, SGSN etc.

A failure may be a failure to receive a particular message, failure of a hardware or software component of a network node. A failure may be full/complete or partial. After a node has been restarted, all its bearer contexts are deleted.

3GPP has started a project called eMBMS restoration procedures, where the objective of is to specify enhanced restoration procedures to explicitly define the Evolved Packet System (EPS) behavior and enable restoration of the eMBMS service when possible in order to minimize the end-user service impact upon different kinds of failure scenarios as follows:
MBMS-GW failure/restart
MME/SGSN failure/restart
MCE failure/restart
BM-SC failure/restart
Sm/Sn path failure
M3AP path failure
SGmb path failure The project will also study and possibly define restoration procedures for the following scenarios:
M1 path failure
SGi-mb path failure So far, Sm path failure/M3AP path failure/MME and SGSN failure/MBMS-GW restart have been discussed and agreed. The rest failure scenarios will be addressed at the coming 3GPP meetings.

Today, there is no time adjustment in the standard and MME implementation, because an Absolute start time (Information Element (IE) "Time of MBMS Data Transfer") is usually used, which in fact requires no adjustment. However, the absolute start time is optional, without it, the adjustment is needed.

According to 3GPP TS 25.413, V.11.3.0, the RNC will reject a MBMS session start message received from another SGSN if the same MBMS services have been established via an existing SGSN. This makes the restoration for Sn failure impossible.

In the current standard, when both a relative start time (IE "Minimum Time to MBMS Data Transfer") and an absolute start time (IE "Time of MBMS Data Transfer") exist in the message, the problem described above will happen.

Moreover, the standard requires, during restoration procedure, that the MME shall send the un-adjusted parameters. Thus, it is not possible to have an adjustment too even without an absolute start time.

SGSN Failure or Sn Path Failure

In eMBMS, during a Sn path failure and in order to re-establish an eMBMS session, the MBMS-GW may select another SGSN and send an MBMS Session Start request message for an MBMS service which was controlled by the old SGSN, where the path between the old SGSN and the MBMS-GW has failed. Subsequently, the new SGSN sends a MBMS session start request to the RNC. But there is an issue according to the existing requirement described in section 8.36.4 in 3GPP TS 25.413, V.11.3.0:

"8.36.4 Abnormal Conditions

If, for a MBMS RAB requested to be set up, the PDP Type Information IE and/or PDP Type Information extension IE is not present, the RNC shall continue with the procedure.

If an MBMS SESSION START message from a given CN Node provides a TMGI IE that is used for an already established and running MBMS Session provided by the same CN Node, and the indicated MBMS Service Area IE refers to an MBMS Service Area that is partially or completely overlapping with the MBMS Service Area of the already established and running MBMS Session, then the RNC shall return an MBMS SESSION START FAILURE message with the cause value "TMGI in Use and overlapping MBMS Service Area".

If an MBMS SESSION START message from a given CN Node provides a TMGI IE that is used for an already established and running MBMS Session provided by another CN Node, and the indicated MBMS Service Area IE refers to a different MBMS Service Area that is partially overlapping with the MBMS Service Area of the already established and running MBMS Session, then the RNC shall return an MBMS SESSION START FAILURE message with the cause value "TMGI in Use and overlapping MBMS Service Area"."

PDP mentioned above is short for Packet Data Protocol. TMGI is a parameter that may be comprised in the MBMS Session Start request message and is short for Temporary Mobile Group Identity. The TMGI uniquely identifies the MBMS Bearer Service.

So, some enhancements are required.

MME Failure/Sm Path Failure or MBMS-GW Failure/SGmb Failure

In eMBMS, if a MBMS-GW failure or a SGmb path failure happens, the BM-SC may select a new MBMS-GW to re-establish the session. Thus, the new MBMS-GW should setup the session with old MME for the ongoing session by sending a MBMS Start Session Request comprising the same TMGI. In the SGmb failure case, since the old MME still keeps a General packet radio service Tunneling Protocol (GTP) session with the old MBMS-GW, when the BM-SC and new MBMS-GW sends a MBMS Start Session Request, it should notify the MME that this Start message is for restoration, otherwise, the MME may discard it. Similarly, if a MME failure or Sm path failure happens, the MBMS-GW may select a new MME to re-establish the control plane. Thus the new MME should setup the control plane with old MCE for the ongoing session by sending a MBMS Start Session Request with the same TMGI. FIG. 1 describes this scenario and involves a MBMS-GW 10, an old MME 13, a new MME 15 and a MCE 18. The scenario comprises the following steps:

Step 101

The MBMS-GW 10 sends a MBMS Session Start request message to the old MME 13.

Step 102

A communication failure between the old MME 13 and the MBMS-GW 10 is detected by the MBMS-GW 10.

Step 103

The MBMS-GW 10 sends a MBMS Session start request message to the new MME 15.

Step 104

The new MME 15 sends a MBMS Session Start request message to the MCE 18.

Note that the old MME 13 and the new MME 15 in FIG. 1 may be the same MME.

However, in the Sm failure case, since the MCE 18 still keeps the old M3AP association with the old MME 13, when the new MME 15 sends a MBMS Start Session Request, it should notify the MCE 18 this Start message is for restoration, otherwise, the MCE 18 may discard it. Currently in the standard, i.e. 3GPP TS 23.007, V.12.0.0, in this failure situation, it is required that the MME should keep all parameters unchanged when it sends a MBMS Start Session Request to the MCE 18. This means that when the MBMS-GW 10 re-establishes the session to the new MME 11, it will comprise the unchanged parameters, such as e.g. "MBMS Session Duration" and "MBMS Time to Data Transfer". Those parameters should be adjusted. Otherwise, the new MME 11 will meet the problem as below with these unchanged parameters.

Note that there are many use cases where no explicit MBMS Stop message is sent to the MME to save the network signaling, by skipping the explicit MBMS session stop request message, the downstream nodes, e.g. MME/SGSN/MCE/RNC may locally delete resources for the eMBMS service once the duration is expired. So incorrect duration will lead to extra resource allocated in the MME/ SGSN and the MCE/RNC for an implicitly stopped eMBMS session.

For example, if a duration time=2 hours and that the session was started at 1 o'clock. At 2 o'clock restoration happens. Then, the duration time should be 1 hour. Without an adjustment, the new MME receives a session with duration still 2 hours. If the MME misses the MBMS Stop Session Request from the MBMS-GW due to a Sm link failure, the session will be hanging for 1 more hour, in which period the session with the same TMGI cannot be re-started. This may be because the MME may only remove that session after duration time expires. The same problem exists for MCE It is also the same problem for the SGSN when a new SGSN has been selected to re-establish the eMBMS session control path by the MBMS-GW. In such case, the MBMS-GW may use the adjusted duration instead.

SUMMARY

An objective of embodiments herein is therefore to obviate at least one of the above disadvantages and to provide an enhanced restoration procedure in a communications network.

According to a first aspect, the objective is achieved by a method in a second CN node for handling a failure in a communications network. The failure has caused a session between the second CN node and an old first CN node to become unavailable. When the failure has been detected, the second CN node transmits a session start request message to a new first CN node. The session start request message is a request to restore the session. The session start request message comprises a restoration flag indicating restoration of the session established before the failure and allowing the RAN node in the communications network to accept the session start request message.

According to a second aspect, the objective is achieved by a method in a new first CN node for handling a failure in a communications network. The failure has caused a session between a second CN node and an old first CN node to become unavailable. When the failure has been detected, the new first CN node receives a session start request message from a second CN node. The session start request message is a request to restore the session. The session start request message comprises a restoration flag indicating restoration of the session established before the failure and allowing the RAN node to accept the session start request message. The new first CN node transmits the session start request message to the RAN node.

According to a third aspect, the objective is achieved by a method in a RAN node for handling a failure in a communications network. The failure has caused a session between a second CN node and an old first CN node to become unavailable. When the failure has been detected, the RAN node receives a session start request message from a new first CN node. The session start request message is a request to restore the session. The session start request message comprises a restoration flag indicating restoration of the session established before the failure and allowing the RAN node to accept the session start request message.

According to a fourth aspect, the objective is achieved by a second CN node for handling a failure in a communications network. The failure has caused a session between the second CN node and an old first CN node to become unavailable. The second CN node is adapted to, when the failure has been detected, transmit a session start request message to a new first CN node. The session start request message is a request to restore the session. The session start request message comprises a restoration flag indicating restoration of the session established before the failure and allowing the RAN node in the communications network to accept the session start request message.

According to a fifth aspect, the objective is achieved by a new first CN node, for handling a failure in a communications network. The failure has caused a session between a second CN node and an old first CN node to become unavailable. The new first CN node is adapted to, when the failure has been detected, receive a session start request message from a second CN node. The session start request message is a request to restore the session. The session start request message comprises a restoration flag indicating restoration of the session established before the failure and allowing the RAN node to accept the session start request message. The new first CN node is further adapted to transmit the session start request message to the RAN node.

According to a sixth aspect, the objective is achieved by a RAN node for handling a failure in a communications network. The failure has caused a session between a second CN node and an old first CN node to become unavailable. The RAN node is adapted to, when the failure has been detected, receive a session start request message from a new first CN node. The session start request message is a request to restore the session. The session start request message comprises a restoration flag indicating restoration of the session established before the failure and allowing the RAN node to accept the session start request message.

In case of a failure in the communication network, such as e.g. a failure related to the SGSN, MME or MBMS-GW or related to a Sn/Sm path failure, the restoration procedure is enhanced by using at least one of a restoration flag, a cause code parameter, an adjusted session duration parameter and an adjusted time to data transfer parameter.

The restoration flag may be transmitted over at least one of the Sn/Sm interface, the Iu/M3 interface and SGmb interface. The purpose of restoration flag is to indicate restoration of the session established before the failure and allow a RAN node to accept the session start request message for the very same service established before the failure. The restoration flag is needed as the RAN node needs to differentiate whether it is an error (so it should reject the session start request message) or it is a restoration procedure (so it should accept the session start request message).

The cause code is transmitted over the Sn interface. The cause code parameter is relevant for the case when the RAN node does not support the restoration flag and rejects session start message, so a new selected first CN node can pass the rejection cause (over Iu, i.e. "TMGI in Use and overlapping MBMS Service Area") to the second CN node, so that the second CN node can re-try after the maximum Sn path failure duration timer in the old first CN node expires, (in that case, the old first CN node will initiate the deletion of session associated with the second CN node where the Sn path between the old first CN node and the second CN node has failed.

The adjusted session duration parameter and an adjusted time to data transfer parameter enables the first and second CN nodes to be synchronized regarding the real duration time of a session so that no confusion exists during the restoration.

Embodiments herein afford many advantages, of which a non-exhaustive list of examples follows:

A further advantage of the embodiments makes it possible to restore the MBMS Session over an alternative control plane which minimizes the impact to the MBMS service, when a failure is detected over the old control plane path.

An advantage of the embodiments herein may be that by the newly introduced parameters/or re-used existing parameter, the adjustment of duration and/or time to data transfer is possible, which optimize the allocation of network resource.

Another advantage of the embodiments herein may be that it supports MME/MBMS-GW restart/SGmb/Sm/Sn path failure without the need for an absolute start time.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to enhancing current restoration procedures in eMBMS network in case of SGSN/MME/MBMS-GW failure or Sn/Sm path failure.

Figure 2:
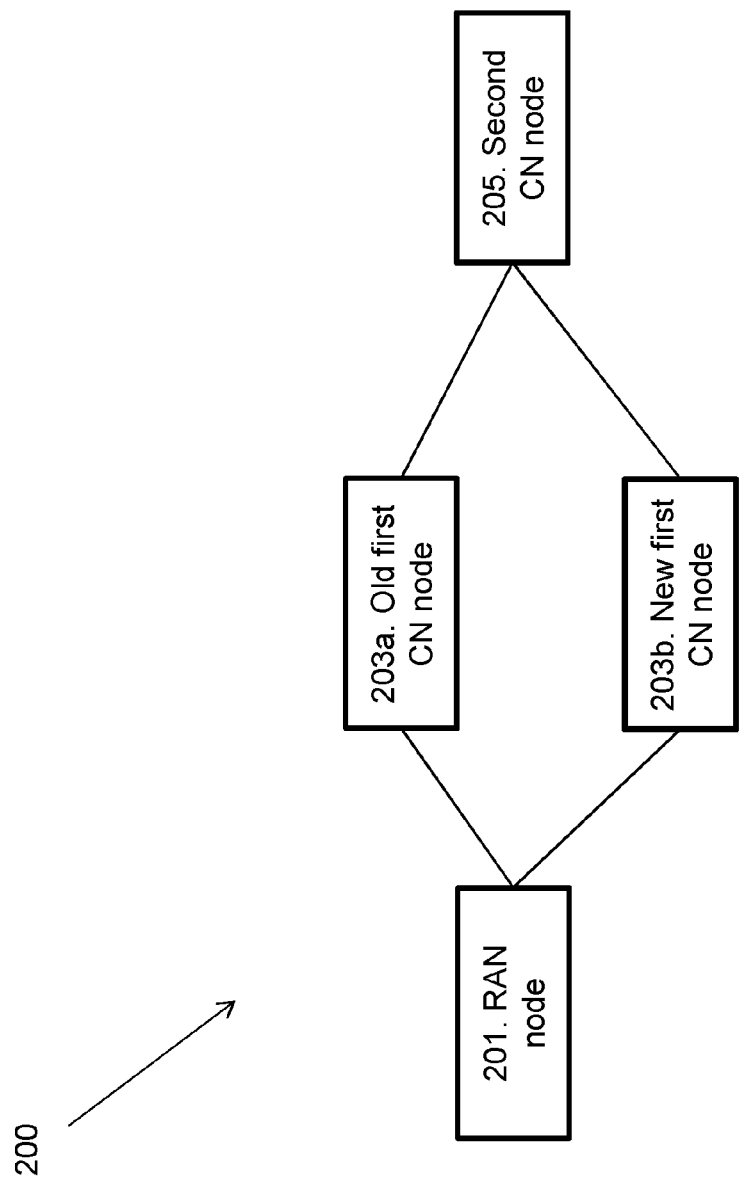
FIG. 2 is a schematic block diagram illustrating embodiments of a communications network.

FIG. 2 depicts a communications network 200 in which embodiments herein may be implemented. The communications network 200 may in some embodiments apply to one or more radio access technologies such as for example LTE, LTE Advanced, Wideband Code Division Multiple Access (WCDMA), Global System for Mobile Communications (GSM), or any other 3GPP radio access technology, or other radio access technologies such as Wireless Local Area Network (WLAN).

The communications network 200 in FIG. 2 comprises a RAN node 201 which is connected to an old first CN node 203a and a new first CN node 203b. The letter a is used to refer to an old node and the letter b is used to refer to a new node. The RAN node 201 may be for example a RNC, a MCE, a BSC or an eNB. The first CN node 203 may be for example a MME/SGSN or a MBMS-GW. In some embodiments, the old first CN node 203a and the new first CN node 203b may be the same node. The old first CN node 203a and the new first CN node 203b are connected to a second CN node 205. The second CN node 205 may be for example a MME/SGSN or a MBMS-GW.

In the following, the terms eMBMS and MBMS may be interchangeable used.

Figure 3:
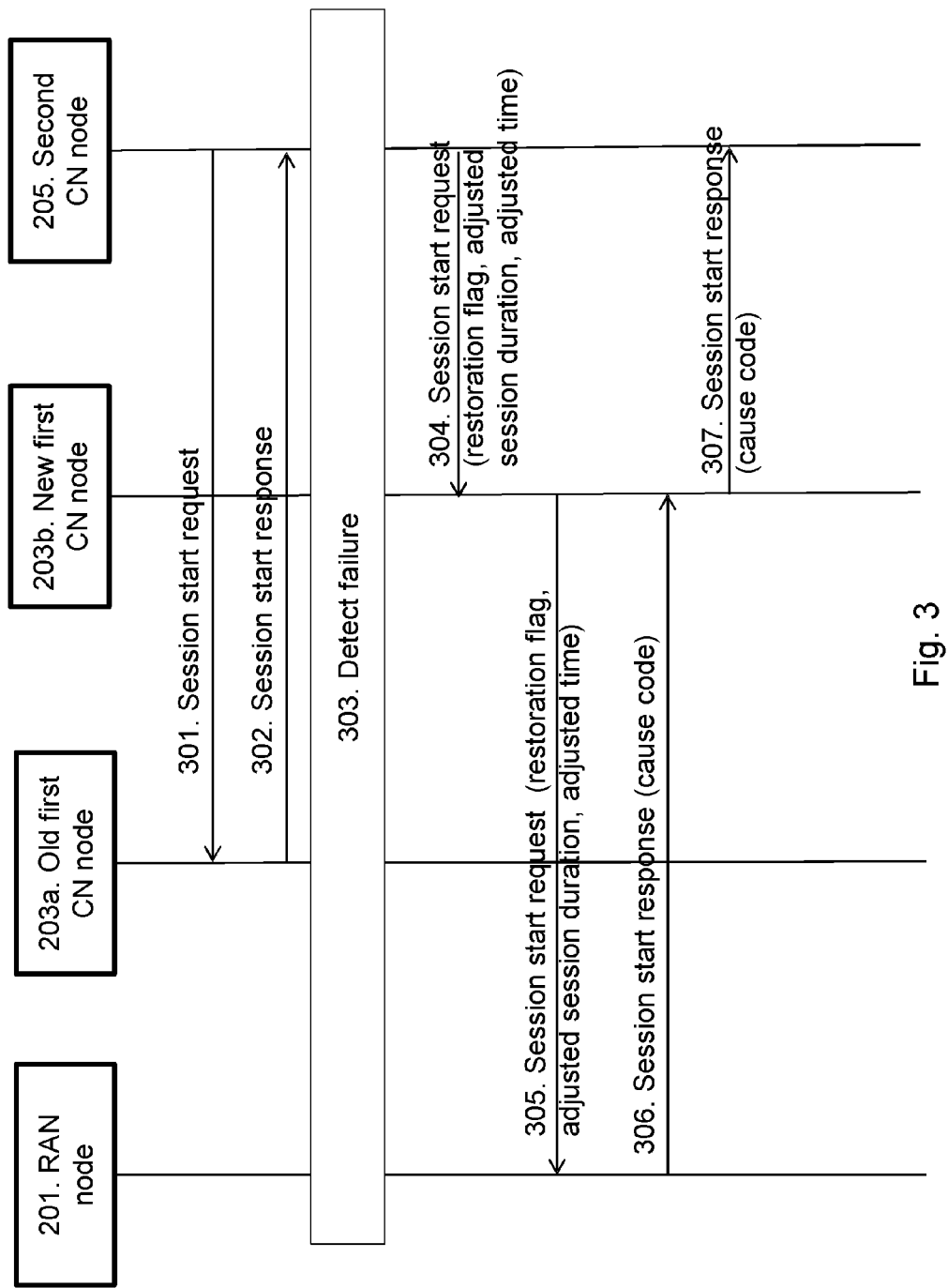
FIG. 3 is a signalling diagram illustrating embodiments of a method.

FIG. 3 is a signaling diagram illustrating embodiments of a method in the communications network 200. The method comprises the following steps, which steps may as well be carried out in another suitable order than described below.

Step 301

The second CN node 205 sends a Session Start request message to the old first CN node 203a. The Session Start request message may be for example a MBMS Session Start request message or an eMBMS Session Start request message.

Step 302

The old first CN node 203a sends a Session Start response message back to the second CN node 205. The response message is a response to the request message in step 301. After having received the Session Start response message, the session is regarded as being active. The Session Start response message may be for example a MBMS Session Start response message or an eMBMS Session Start response message.

The session start response message may comprise information indicating that the second CN node should retry sending of the session start request message after a time has expired.

Step 303

A failure is detected by a node in the communications network 200, i.e. the second CN node 205. As a consequence of the failure, the communication between the old first CN node 203a and the second CN node 205 is not available. This may also be described as a session for a service becoming unavailable or losing of control as a result of the failure. The failure may take place any time after the response in step 302 has been received, i.e. any time after the session has become active. The failure may also take place before the response message is received in step 302, i.e. before the session has become active. The failure may be detected by the second CN node 205 using a separate detection mechanism, e.g. echo request/response. The failure may be a failure of a CN node, e.g. SGSN/MME 205, 210 or MBMS-GW 207 failure or a Sn/Sm/SGmb path failure.

Step 304

When the failure has been detected by the CN node 205, the second CN node 205 must find a new first CN node 203b and transmits a Session Start request message to this new first CN node 203b.

The Session Start request message comprises a number of parameters. These parameters are at least one of a restoration flag, an adjusted session duration and an adjusted time to data transfer. The purpose of restoration flag is to indicate restoration of the session established before the failure and allow the RAN node 201 to accept the Session Start request message for the session for very same service established as before the failure. The service may be an eMBMS or MBMS service. This should not be confused with a M3AP session, which is between the MCE/RNC and the MME/SGSN. A M3AP session is not the same as the first node is changed, e.g. MME1 to MME2. The restoration flag is needed as the RAN node 201 needs to differentiate whether it is an error (so it may reject it) or it is a restoration procedure (so it may accept it). The restoration flag may indicate to the second CN node 205 that it needs to retry with the session start request message after a timer in the old first CN node 203a expires. If a session data transmission has been ongoing when the failure occurred, the adjusted time to data transfer may be set to 0. The parameters "adjusted session duration" and "adjusted time to data transfer" are conditional. These parameters will be described in more detail below with reference to FIG. 5. The Session Start request message may be for example a MBMS Session Start request message or an eMBMS Session Start request message. In some embodiments, the restoration flag is also referred to as an MBMS session re-establishment indication flag.

In some embodiments, the restoration flag may indicate a re-establishment of a session for the same service, requiring the receiving node, e.g. the RAN 201, 403a, 403b to accept the session start request message. In other embodiments, the restoration flag allows the RAN node 201, 403 to identify this is the restoration procedure for an existing MBMS session and accepts it. When a timer expires, e.g. called Max path failure timer, the second CN node 205, 407 may consider that the first node is down, and takes decision to send session start request to another first CN node.

The adjusted session duration may indicate the remaining duration of the session. The adjusted time to data transfer may indicate the minimum time occurring between the transmission of the session start request message and the actual start of the data transfer. If there is no absolute start time parameter (i.e. an "MBMS data transfer start" parameter) has been received, the MBMS-GW may change the relative start time ("time to MBMS data transfer" parameter) to fasten the restoration of the MBMS service in E-UTRAN.
Step 305

When the new first CN node 203b has received the Session Start request message in step 304, it may send the Session Start request message further to the RAN node 201. The Session Start request message comprises at least one of the parameters restoration flag, an adjusted session duration and an adjusted time to data transfer. These parameters will be described in more detail below with reference to FIG. 5. The Session Start request message may be for example a MBMS Session Start request message or an eMBMS Session Start request message. In some embodiments, the session start response message comprises a cause code. The cause code may indicate that the RAN node 201 supports the restoration flag and indicates that the session start request message has been accepted by the RAN node 201.
Step 306

The RAN node 201 receives the Session Start request message and may reply to the new first CN node 203b with a Session Start response message. The Session Start response message may comprise a parameter referred to as a cause code. The cause code may be described as an indication indicating if the RAN node 201 supports the restoration flag and that the request has been accepted. This parameter will be described in more detail below with reference to FIG. 5. The Session Start response message may be for example a MBMS Session Start response message or an eMBMS Session Start response message. The cause code may also be described as an indication indicating if the RAN node 201 supports the restoration flag and if the request in step 305 has been accepted. In some embodiments, restoration flag may also be comprised in the response message.
Step 307

The new first CN node 203b may reply the Session start response message to the second CN node 205 comprising the cause code, and possibly also the restoration flag. Thus, the failure has been restored by setting up a session for the same service as before the failure with the new first CN node 203b instead of the old first CN node 203a. The restoring of the failure may also be described as re-establishing the failure. In the following, the terms restoring and re-establishing may be used exchangeable.

Figure 1:
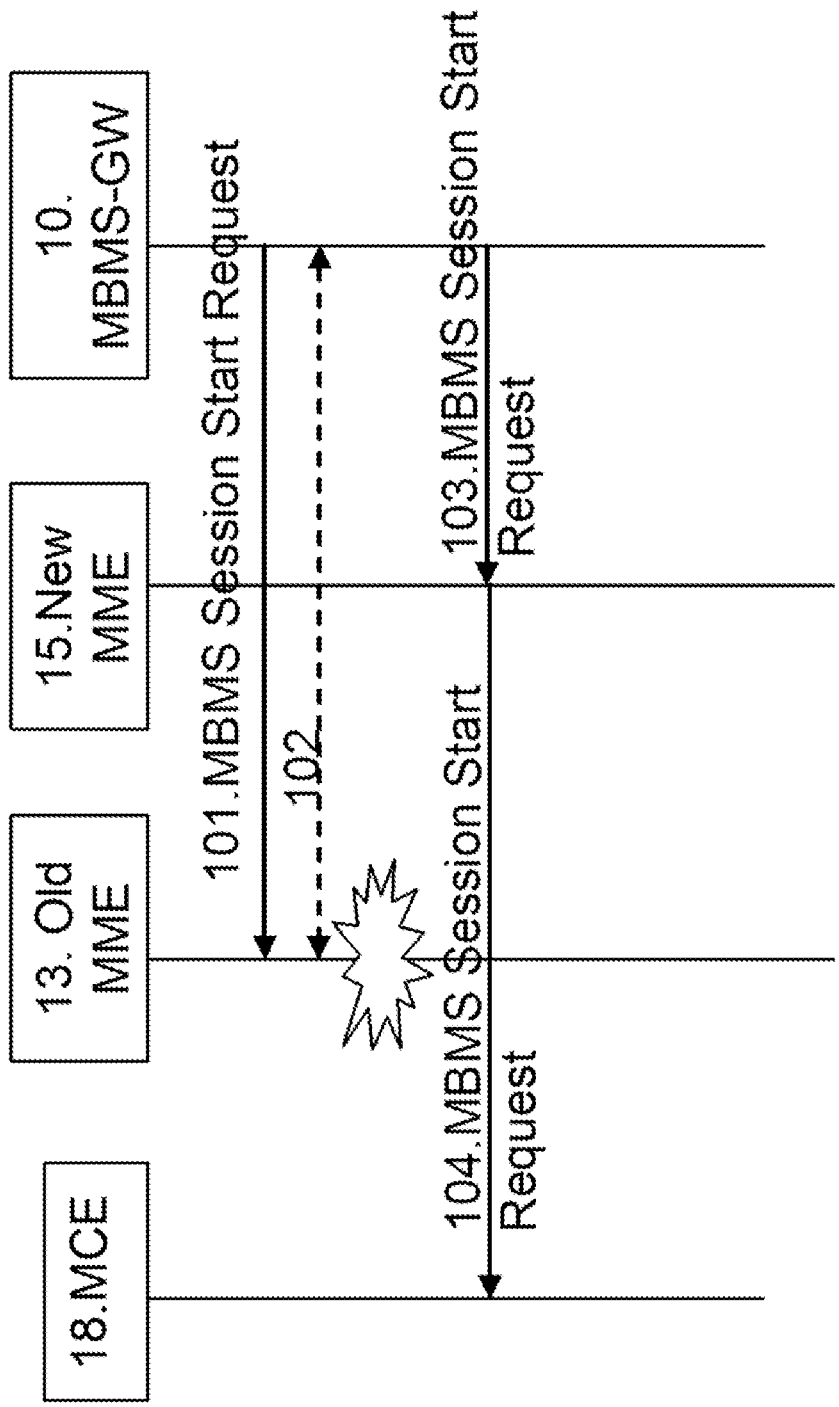
FIG. 1 is a signaling diagram illustrating embodiments of a method for eMBMS session restoration.
Figure 4:
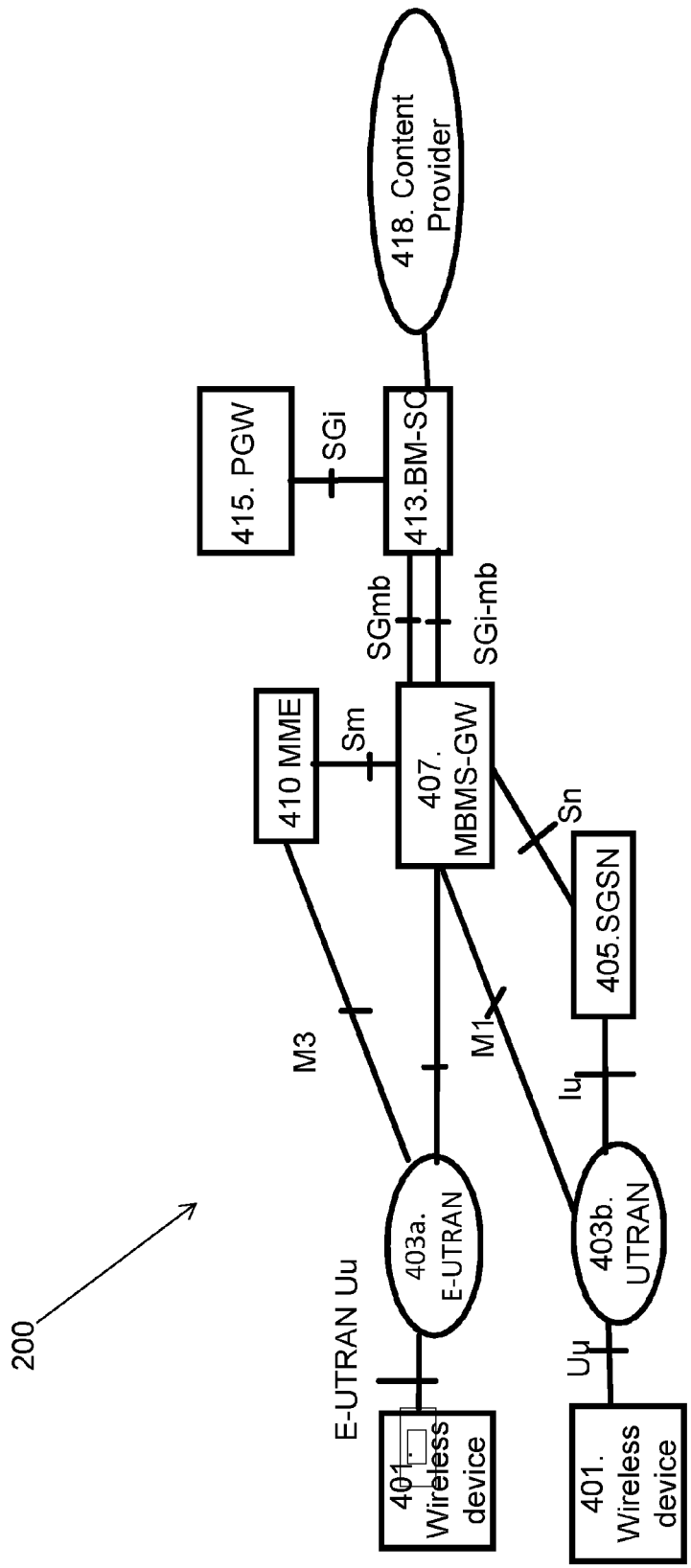
FIG. 4 is a schematic block diagram illustrating embodiments of a communications network.

FIG. 4 illustrates the communications network 200 in more detail. The FIG. 4 corresponds to FIG. 1b in 3GPP TS 23.246, V. 11.10, and illustrates a reference architecture for EPS with Evolved-Universal Terrestrial Radio Access Network (E-UTRAN) and Universal Terrestrial Radio Access Network (UTRAN) (MBMS Broadcast Mode only).

The communications network 200 exemplified in FIG. 4 comprises a wireless device 401 connected to a RAN, i.e. either E-UTRAN 403a via the E-UTRAN Uu interface or UTRAN 403b via the Uu interface. The RAN comprises at least one RAN node. In case of UTRAN 403b, the RAN node may be e.g. a RNC and in case of E-UTRAN 403a, the RAN node may be an eNB. In the following, when the reference number 403 is used it refers to a RAN node, regardless of whether it is a RNC, BSC, MCE, eNB etc. The UTRAN 403b is connected to a SGSN 405 via the Iu interface. The UTRAN 403b is connected to a MBMS-GW 407 via the M1 interface. The SGSN 405 is connected to the MBMS-GW 407 via the Sn interface. The E-UTRAN 403a is connected to the MBMS-GW 407 via the M1 interface, and connected to the MME 410 via the M3 interface. The MME 410 is connected to the MBMS-GW 407 via the Sm interface. The SGSN 405 and the MME 410 in FIG. 4 are example of the first CN nodes 203a, 2003b in FIG. 2. The MME 410 and the SGSN 405 may be separate nodes or they may be co-located in one node. Therefore, the term MME/SGSN 405, 410 refers to a MME or a SGSN or a co-located MME and SGSN in the following.

The MBMS-GW 407 is connected to the BM-SC 413 via the SGmb interface and/or the SGi-mb interface. The BM-SC 413 is connected to the Packet data network GateWay (PGW) 415 via the SGi interface. The BM-SC 413 is connected to the Content provider 418. In addition to MBMS Bearers (over SGmb/SGi-mb), the BM-SC 413 may use EPS Bearers (over SGi) to realize an MBMS User Service Note that the MCE is not shown in the FIG. 4. The MBMS service over Gn-SGSN is supported when the MBMS-GW 407 is co-located with the PGW 415 and this PGW 415 has the necessary Gateway General packet radio service Support Node (GGSN) functions to control the MBMS Bearer Service over the Gn interface.

The wireless device 401 may be a device by which a subscriber may access services offered by an operator's network and services outside operator's network to which the operators radio access network and core network provide access, e.g. access to the Internet. The wireless device 401 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, M2M device, D2D device, IoT device or any type of consumer electronic, for instance but not limited to television, radio, lighting arrangements, tablet computer, laptop or PC. The wireless device 401 may be portable, pocket storable, hand held, computer comprised, or vehicle mounted devices, enabled to communicate voice and/or data, via the radio access network, with another entity, such as another wireless device or a server.

It should be noted that the communication link between the network nodes in the communications network 200 may be any suitable kind. The links may use any suitable protocol depending on type and level of layer (e.g. as indicated by the Open Systems Interconnection (OSI) model) as understood by the person skilled in the art.

Figure 5:
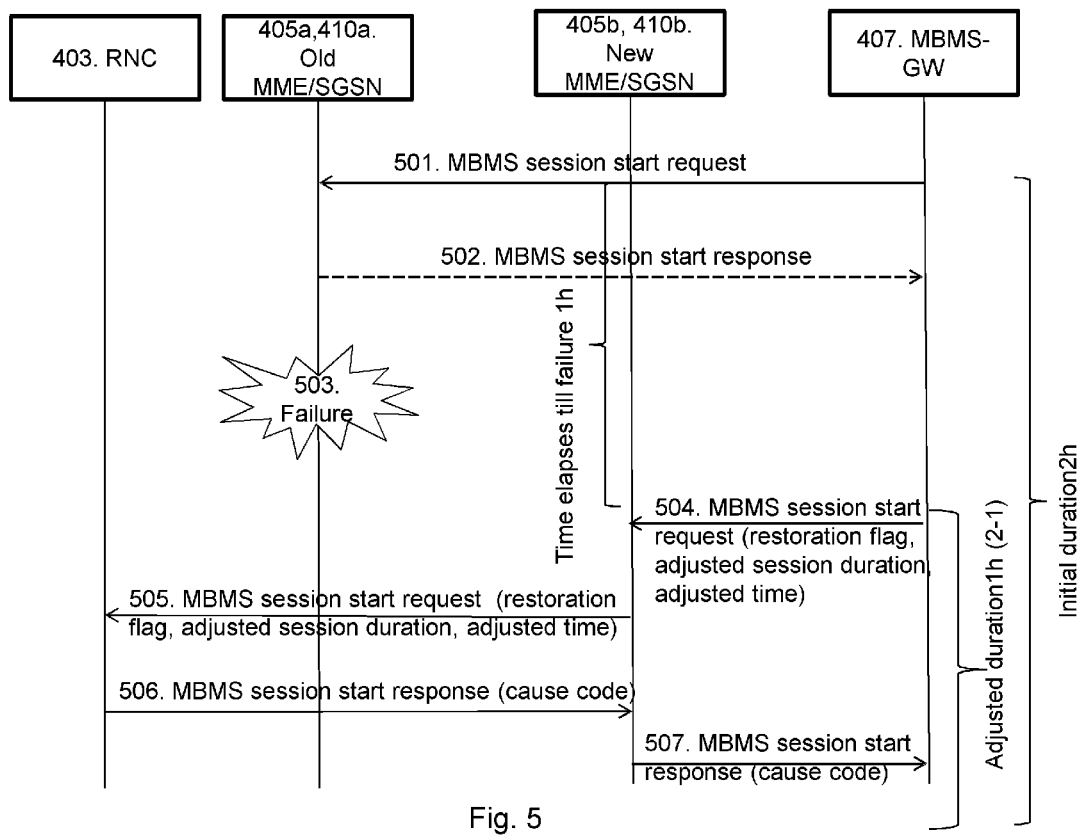
FIG. 5 is a signalling diagram illustrating embodiments of a method.

FIG. 5 is a signaling diagram illustrating embodiments of a method in the communications network 200 in case of a MME/SGSN 405, 410 failure. FIG. 5 uses the architecture of FIG. 4 as a reference. In FIG. 5, the RAN node 403 is exemplified with a RNC 403, the old first CN node 203a, 405a, 410a is exemplified with an old MME/SGSN, the new first CN node 203b, 405b, 410b is exemplified with a new MME/SGSN and the second CN node 205, 407 is exemplified with a MBMS-GW. However, any other suitable RAN node, old first CN node, new first CN node and second CN node is also applicable, as understood by the skilled person. The method comprises the following steps, which steps may as well be carried out in another suitable order than described below:

Step 501

This step corresponds to step 301 in FIG. 3. The MBMS-GW 407 sends a MBMS Session Start request message to the old MME/SGSN 405a, 410a.

Step 502

This step corresponds to step 302 in FIG. 3. The old MME/SGSN 405a, 410a sends a MBMS Session Start response message to the MBMS-GW 407. The response message is a response to the request message in step 501.

Step 503

This step corresponds to step 303 in FIG. 3. A failure related to the old MME/SGSN 405a, 410a happens. As a consequence of the failure, the communication between the old MME/SGSN 405a, 410a and the MBMS-GW 407 is not available. In other words, a session between the old MME/SGSN 405a, 410a and the MBMS-GW 407 becomes unavailable or losing the control.

Step 504

This step corresponds to step 304 in FIG. 3. Since the old MME/SGSN 405a, 410a has failed, the MBMS-GW 407 needs to send the MBMS Session Start request message to a new MME/SGSN 405b, 410b. In some embodiments, the old MME/SGSN 405a, 410a and the new MME/SGSN 405b, 410b is the same node.

In FIG. 5, an example of time is illustrated. For example, during the MBMS session initial establishment, the session is scheduled to be broadcasted for 2 hours (initial duration), and after 1 hour (time elapses after 1 hour), the MBMS-GW 407 detects the failure, it should then adjust the duration to 2 h–1 h=1 h in the MBMS Session Start request message sent in step 504.

Step 505

This step corresponds to step 305 in FIG. 3. The new MME/SGSN 405b, 410b sends the MBMS Session Start request message to the RNC 403. The MBMS Session Start request message comprises at least one of the restoration flag and the adjusted duration parameter and the adjusted time to data transfer parameter, e.g. "Adjusted MBMS Session Duration" and "Adjusted MBMS Time to Data Transfer".

The restoration flag may be transmitted over the Sn/Sm interface (to be added in 3GPP TS 29.274) and the Iu/M3 interface (to be added in 3GPP TS 25.413 and 3GPP TS 36.444). As mentioned above, the Sn interface is between the SGSN 405 and the MBMS-GW 407, the Sm interface is between the MME 410 and the MBMS-GW 407, the Iu interface is between the UTRAN 403b and the SGSN 405 and the M3 interface is between the E-UTRAN 403a and the MME 410. The restoration flag may also be referred to as a restoration parameter. The purpose of restoration flag is to allow the RNC 403 to accept the MBMS Session Start request message for the very same MBMS service established before the failure. The restoration flag is needed as the RNC 403 needs to differentiate whether it is an error (so it may reject it) or it is a restoration procedure (so it may accept it).

The embodiments herein are also related to solving the previously described problem by introducing a new parameter to indicate the time adjustment and possible restoration procedure. To let the MME/MCE/MBMS-GW be synchronized about the real duration time, thus no confusion exists during restoration.

The two parameters, for example called "Adjusted MBMS Session Duration" and "Adjusted MBMS Time to Data Transfer" may be sent during a MBMS session start procedure over the SGmb and/or Sm/Sn and/or M3/Iu interfaces, if needed. If a session data transmission has been ongoing, the "Adjusted MBMS Time to Data Transfer" may be 0. The parameters "Adjusted MBMS Session Duration" and "Adjusted MBMS Time to Data Transfer" are sent in a MBMS Session Start Request message in the following cases:

- When the BM-SC 413 restarts (re-establish) a session towards a new MBMS-GW 407 (e.g., due to old MBMS-GW 407 restart or SGmb interface failure) while the session has been ongoing.
- When MBMS-GW 407 restarts a session towards a new MME/SGSN 405, 410 (due to old MME/SGSN 405, 410 restart or Sm/Sn path failure) while the session has been ongoing.
- When a new MCE joins the eMBMS session, the MME 405 starts the session for this MCE but the session has been ongoing for a while.

These parameters may be used to indicate the real duration of eMBMS session to the MBMS-GW 407 and/or the MME 405 and/or the MCE, meanwhile it may be the indication of an ongoing restoration procedure. The MBMS-GW 407 or the MME 405 or the MCE may always accept this MBMS Session Start Request for an existing session and update the Fully Qualified Tunnel End Point Identifier (F-TEID) or M3AP association accordingly.

The parameter "MBMS Session Duration" and "MBMS-Time-To-Data-Transfer" (named as "Minimum Time To MBMS Data Transfer" in the Sm interface) may be kept unchanged during the lifetime of the session or set to the value as the same as the "Adjusted MBMS Session Duration" and "Adjusted MBMS Time to Data Transfer", i.e. re-use MBMS Session Duration" and "MBMS-Time-To-Data-Transfer instead of introducing new parameters.

For example, if a duration time=2 hours, the session was started at 1 o'clock, at 2 o'clock restoration happens, the duration time may be 1 hour. With adjustment, the new MME receives a session with duration of 1 hour. Even though the MME/SGSN 405,410 misses the MBMS Stop Session Request from the MBMS-GW 407 due to a Sm link failure, the session will not be hanging for 1 more hour. Thus, the session with the same TMGI may be re-started in this period.

Returning to FIG. 5.

Step 506

This step corresponds to step 306 in FIG. 3. The RNC 403 transmits a MBMS Session Start response message to the new MME/SGSN 405b, 410b. The MBMS Session Start response message comprises the cause code. The cause code may be introduced over Sn interface (to be added to 3GPP TS 29.274). The new cause code is for the case when the RNC 403 does not support the restoration flag and rejects the MBMS session start message, so the new selected MME/SGSN 405, 410 may pass the rejection cause (over Iu, i.e. "TMGI in Use and overlapping MBMS Service Area") to the MBMS-GW 407, so that the MBMS-GW 407 may re-try after the maximum Sn path failure duration timer in the old MME/SGSN 405, 410 expires. In that case, the old MME/SGSN 405, 410 will initiate the deletion of MBMS session associated with the MBMS-GW 407 where the Sn path between the old MME/SGSN 405, 410 and MBMS-GW 407 has failed.

Step 507

This step corresponds to step 307 in FIG. 3. The new MME/SGSN 405*b*, 410*b* transmits the MBMS Session start response message comprising the cause code to the MBMS-GW 407. Thus, the failure has been restored by setting up a session for the same session as established before the failure with the new MME/SGSN 405*b*, 410*b* instead of the old MME/SGSN 405*a*, 410*a*.

Figure 6:
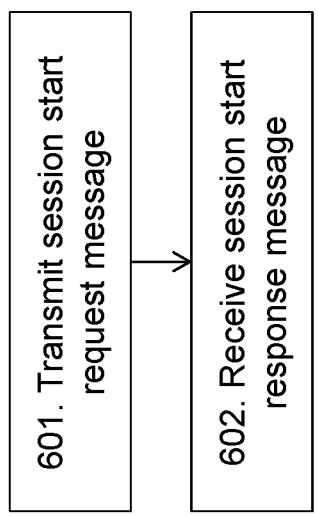
FIG. 6 is a flow chart illustrating embodiments of a method performed by the second CN node.

The method described above will now be described seen from the perspective of the second CN node 205, 407. FIG. 6 is a flowchart describing the present method in the second CN node 205, 407 for handling the failure in the communications network 200. The failure has caused the session between the second CN node 205, 407 and the old first CN node 203*a* to become unavailable. The failure may be related to a MME, a SGSN, a MBMS-GW, a SGmb path or a Sn/Sm path. The session is one of a MBMS session and an eMBMS session. The second CN node 205, 407 may be a MBMS-GW or a BM-SC. The new first CN node 203*b*, 405*b*, 410*b* may be a one of a MME/SGSN and a MBMS-GW, the old first CN node 203*a* is one of a MME/SGSN and a MBMS-GW respectively. The RAN node 201, 403 may be one of a RNC, a MCE, a BSC. The method comprises the following steps to be performed by the second CN node 205, 407, which steps may be performed in any suitable order than described below:

Step 601

This step corresponds to step 304 in FIG. 3 and step 504 in FIG. 5. When the failure has been detected, the second CN node 205, 407 transmits a session start request message to the new first CN node 203*b*, 405*b*, 410*b*. The session start request message is a request to restore the session. The session start request message comprises a restoration flag indicating restoration of the session for a same service established before the failure and allowing the RAN node 201, 403 in the communications network 200 to accept the session start request message. The session start request message may further comprise at least one of an adjusted session duration and an adjusted time to data transfer.

Step 602

This step corresponds to step 307 in FIG. 3 and step 507 in FIG. 5. In some embodiments, the second CN node 205, 407 receives a session start response message from the first new CN node 203*b*, 405*b*, 410*b*. The session start response indicates that the failure has been restored by setting up a session with the new first CN node 203*b*, 405*b*, 410*b* instead of the old first CN node 205, 407.

Figure 7:
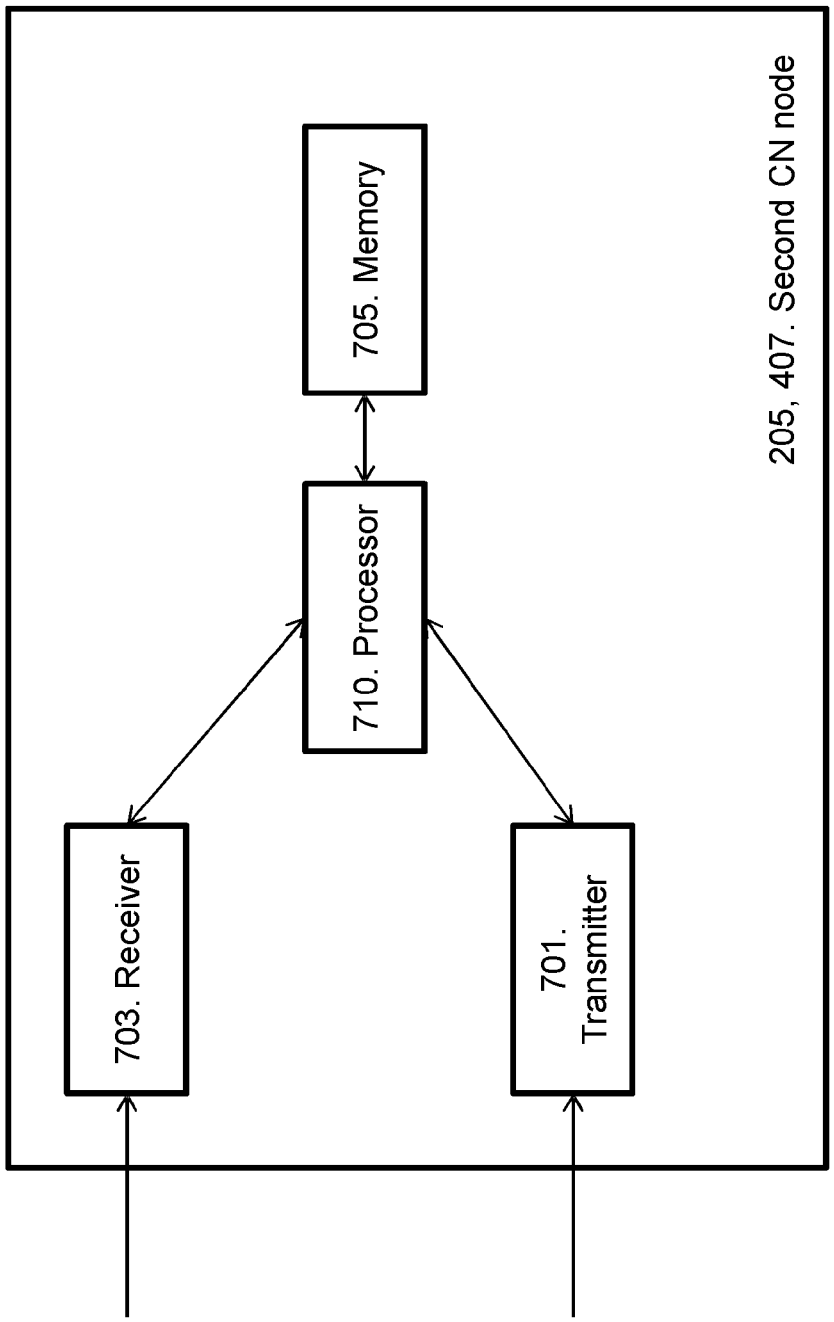
FIG. 7 is a schematic block diagram illustrating embodiments of a second CN node.

Embodiments of the second CN node 205, 407 adapted to perform the method actions for handling a failure in the communications network 200, as described above in relation to FIGS. 3, 5 and 6 is depicted in FIG. 7. The failure has caused a session between the second CN node 205, 407 and the old first CN node 203*a* to become unavailable. The failure may be related to a MME, a SGSN, a MBMS-GW, a SGmb path or a Sn/Sm path. The session may be one of a MBMS session and an eMBMS session. The second CN node 205, 407 may be a MBMS-GW or a BMSC.

The second CN node 205, 407 is adapted to, e.g. by means of a transmitter 701, when the failure has been detected, transmit a session start request message to the new first CN node 203*b*, 405*b*, 410*b*. The session start request message is a request to restore the session. The session start request message comprises a restoration flag indicating restoration of the session established before the failure and allowing the RAN node 201, 403 in the communications network 200 to accept the session start request message. The session start request message may further comprise at least one of an adjusted session duration and an adjusted time to data transfer. The new first CN node 203*b*, 405*b*, 410*b* may be a one of a MME/SGSN and a MBMS-GW. The old first CN node 203*a* may be one of a MME/SGSN and a MBMS-GW respectively. The RAN node 201, 403 may be one of a RNC, a MCE and a BSC. The transmitter 701 may also be referred to as a transmitting module, a transmitting means, a transmitting unit, a transmitting circuit, means for transmitting or an output unit. The transmitting unit 603 may be a wireless transmitter of the second CN node 205, 407 of a wireless or fixed communications system.

The second CN node 205, 407 may be further adapted to, e.g. by means of a receiver 703, receive a session start response message from the first new CN node 203*b*, 405*b*, 410*b*. The session start response indicates that the failure has been restored by setting up a session with the new first CN node 203*b*, 405*b*, 410*b* instead of the old first CN node 205, 407. The receiver 703 may also be referred to as a receiving module, a receiving means, a receiving unit, a receiving circuit, means for receiving or an input unit. The receiving unit 703 may be a wireless receiver of the second CN node 205, 407 of a wireless or fixed communications system.

The second CN node 205, 407 may further comprise a memory 705 comprising one or more memory units. The memory 705 is arranged to be used to store data, received data streams, the session start request messages, the session start response messages, restoration flag, the adjusted session duration, the adjusted time to transfer, the cause code, threshold values, time periods, configurations, schedulings, and applications to perform the methods herein when being executed in the second CN node 205, 407. The memory 705 may also be referred to as a memory module, a storing means, a memory circuit or means for storing.

Those skilled in the art will also appreciate that the receiver 703 and transmitter 701 may refer to a combination of analog and digital circuits, and/or one or more processors configured with software and/or firmware, e.g. stored in a memory, that when executed by the one or more processors such as a processor 710 perform as described below. In particular embodiments, some or all of the functionality described above as being provided by MME/SGSNs, MBMS-GWs or other forms of the second CN node 205, 407 may be provided by the processor 710 executing instructions stored on a computer-readable medium, such as the memory 705 shown in FIG. 7. Alternative embodiments of the second CN node 205, 407 may comprise additional components beyond those shown in FIG. 7 that may be responsible for providing certain aspects of the second CN node's functionality, comprising any of the functionality described above and/or any functionality necessary to support the embodiments described herein.

A computer program may comprise instructions which, when executed on at least one processor, e.g. such as the processor 710, cause the at least one processor to carry out the method as described in relation to FIGS. 3, 5 and 6. A carrier may comprise the computer program, wherein the carrier is one of an electronic signal, optical signal, radio signal or computer readable storage medium.

Figure 8:
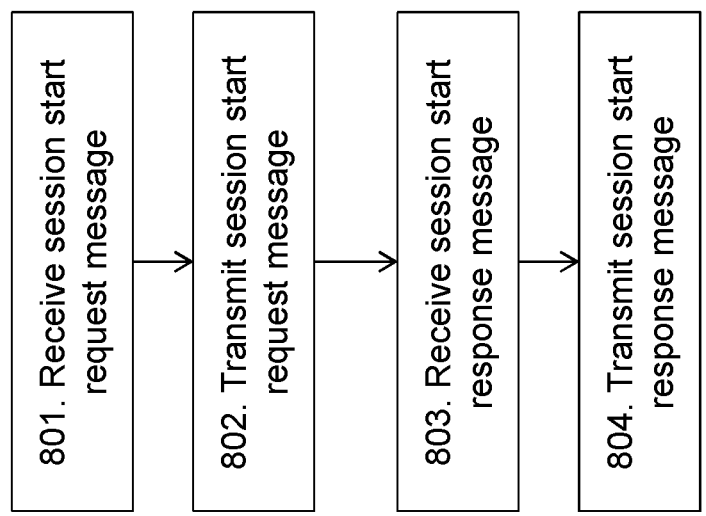
FIG. 8 is a flow chart illustrating embodiments of a method performed by the new first CN node.

The method described above will now be described seen from the perspective of the new first CN node 203*b*, 405*b*, 410*b*. FIG. 8 is a flowchart describing the present method in the new first CN node 203*b*, 405*b*, 410*b* for handling a failure in the communications network 200. The failure has caused a session between the second CN node 205, 407 and the old first CN node 203*a* to become unavailable. The failure may be related to a MME, a SGSN, a MBMS-GW, a SGmb path or a Sn/Sm path. The session may be one of a MBMS, session and an eMBMS session. The second CN node 205, 407 may be one of a MBMS-GW and a BM-SC. The new first CN node 203*b*, 405*b*, 410*b* may be one of a MME/SGSN and a MBMS-GW, and the old first CN node 203*a* is one of a MME/SGSN and a MBMS-GW respectively. The RAN node 201, 403 may be one of a RNC, a MCE and a BSC. The method comprises the following steps to be performed by the new first CN node 203*b*, 405*b*, 410*b*, which steps may be performed in any suitable order than described below:

Step 801

This step corresponds to step 304 in FIG. 3 and step 504 in FIG. 5. When the failure has been detected, the new first CN node 203*b*, 405*b*, 410*b* receives a session start request message from the second CN node 205, 407. The session start request message is a request to restore the session. The session start request message comprises a restoration flag indicating restoration of the session established before the failure and allowing the RAN node 201, 403 to accept the session start request message. The session start request message may further comprise at least one of an adjusted session duration and an adjusted time to data transfer.

Step 802

This step corresponds to step 305 in FIG. 3 and step 505 in FIG. 5. The new first CN node 203*b*, 405*b*, 410*b* transmits the session start request message to the RAN node 201, 403.

Step 803

This step corresponds to step 306 in FIG. 3 and step 506 in FIG. 5. In some embodiments, the new first CN node 203*b*, 405*b*, 410*b* receives a session start response message from the RAN node 201, 403. The session start response message indicates if the session start request message has been accepted by the RAN node 201, 403.

Step 804

This step corresponds to step 307 in FIG. 3 and step 507 in FIG. 5. In some embodiments, the new first CN node 203*b*, 405*b*, 410*b* transmits the session start response message to the second CN node 205, 407.

Figure 9:
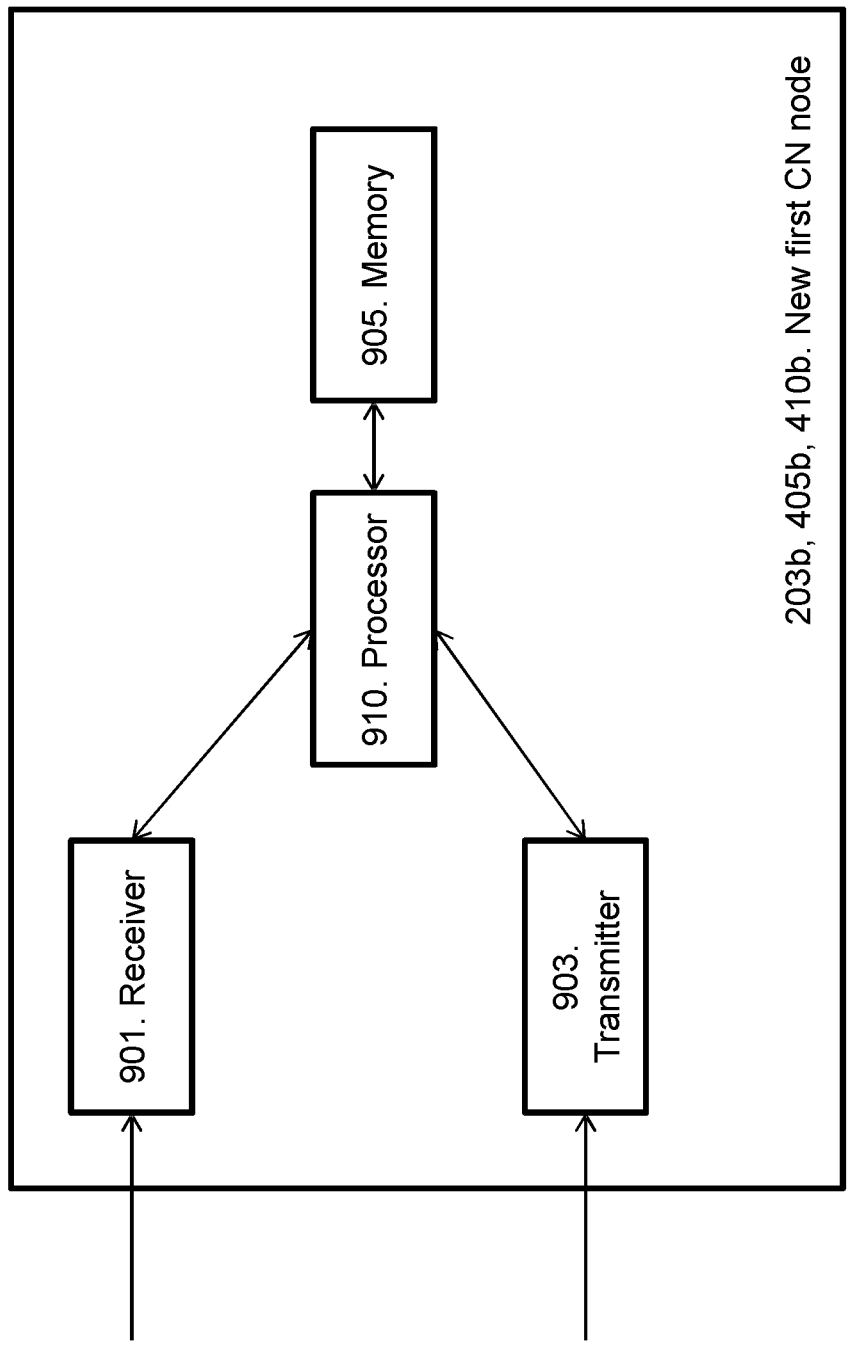
FIG. 9 is a schematic block diagram illustrating embodiments of a new first CN node.

Embodiments of the new first CN node 203*b*, 405*b*, 410*b* adapted to perform the method actions for handling a failure in a communications network 200, as described above in relation to FIGS. 3, 5 and 6 is depicted in FIG. 9. The failure has caused a session between the second CN node 205, 407 and the old first CN node 203*a* to become unavailable. The failure may be related to a MME, a SGSN, a MBMS-GW, a SGmb path or a Sn/Sm path. The session may be one of a MBMS session and an eMBMS session. The second CN node 205, 407 may be one of a MBMS-GW and a BM-SC. The new first CN node 203*b*, 405*b*, 410*b* may be one of a MME/SGSN and a MBMS-GW, and the old first CN node 203*a* may be one of a MME/SGSN and a MBMS-GW respectively. The RAN node 201, 403 may be one of a RNC, a MCE and a BSC.

The new first CN node 203*b*, 405*b*, 410*b* is adapted to, e.g. by means of a receiver 901, when the failure has been detected, receive a session start request message from the second CN node 205, 407. The session start request message is a request to restore the session. The session start request message comprises a restoration flag indicating restoration of the session established before the failure and allowing the RAN node 201, 403 to accept the session start request message. The session start request message may further comprise at least one of an adjusted session duration and an adjusted time to data transfer. The new first CN node 203*b*, 405*b*, 410*b* may be further adapted to, e.g. by means of the receiver 901, receive a session start response message from the RAN node 201, 403. The session start response message indicates if the session start request message has been accepted by the RAN node 201, 403. The receiver 901 may also be referred to as a receiving module, a receiving means, a receiving unit, a receiving circuit, means for receiving or an input unit. The receiving unit 901 may be a wireless receiver of the new first CN node 203*b*, 405*b*, 410*b* of a wireless or fixed communications system. The new first CN node 203*b*, 405*b*, 410*b* is adapted to, e.g. by means of a transmitter 903, transmit the session start request message to the RAN node 201, 403. The new first CN node 203*b*, 405*b*, 410*b* may be further adapted to, e.g. by means of the transmitter 903, transmit the session start response message to the second CN node 205, 407. The transmitter 903 may also be referred to as a transmitting module, a transmitting means, a transmitting unit, a transmitting circuit, means for transmitting or an output unit. The transmitting unit 903 may be a wireless transmitter of the new first CN node 203*b*, 405*b*, 410*b* of a wireless or fixed communications system.

The new first CN node 203*b*, 405*b*, 410*b* may further comprise a memory 905 comprising one or more memory units. The memory 905 is arranged to be used to store data, received data streams, the session start request messages, the session start response messages, restoration flag, the adjusted session duration, the adjusted time to transfer, the cause code, threshold values, time periods, configurations, schedulings, and applications to perform the methods herein when being executed in the new first CN node 203*b*, 405*b*, 410*b*. The memory 905 may also be referred to as a memory module, a storing means, a memory circuit or means for storing.

Those skilled in the art will also appreciate that the receiver 901 and transmitter 903 may refer to a combination of analog and digital circuits, and/or one or more processors configured with software and/or firmware, e.g. stored in a memory, that when executed by the one or more processors such as a processor 910 perform as described below. In particular embodiments, some or all of the functionality described above as being provided by MME/SGSNs, MBMS-GWs or other forms of new first CN node 203*b*, 405*b*, 410*b* may be provided by the processor 910 executing instructions stored on a computer-readable medium, such as the memory 905 shown in FIG. 9. Alternative embodiments of the new first CN node 203*b*, 405*b*, 410*b* may comprise additional components beyond those shown in FIG. 9 that may be responsible for providing certain aspects of the new first CN node's functionality, comprising any of the functionality described above and/or any functionality necessary to support the embodiments described herein.

A computer program may comprise instructions which, when executed on at least one processor, e.g. such as the processor 910, cause the at least one processor to carry out the method as described in relation to FIGS. 3, 5 and 8. A carrier may comprise the computer program, wherein the carrier is one of an electronic signal, optical signal, radio signal or computer readable storage medium.

Figure 10:
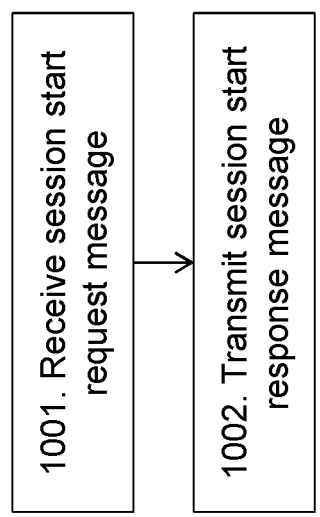
FIG. 10 is a flow chart illustrating embodiments of a method performed by the RAN node.

The method described above will now be described seen from the perspective of the RAN node 201, 403. FIG. 10 is a flowchart describing the present method in the RAN node 201, 403 for handling a failure in the communications network 200. The failure has caused a session between the second CN node 205 and the old first CN node 203a to become unavailable. The failure may be related to a MME, a SGSN, MBMS-GW, a SGmb path or a Sn/Sm path. The session may be one of a MBMS session and eMBMS, session. The second CN node 205, 407 is a MBMS-GW or a BM-SC. The new first CN node 203b, 405b, 410b may be one of a MME/SGSN and a MBMS-GW, and the old first CN node 203a may be one of a MME/SGSN and a MBMS-GW. The RAN node 201, 403 may be one of a RNC, a MCE and a BSC. The method comprises the following steps, which steps may be performed by the RAN node 201, 402 in any suitable order than described below:

Step 1001

This step corresponds to step 305 in FIG. 3 and step 505 in FIG. 5. When the failure has been detected, the RAN node 201, 402 receives a session start request message from a new first CN node 203b, 405b, 410b. The session start request message is a request to restore the session. The session start request message comprises a restoration flag indicating restoration of the session established before the failure and allowing the RAN node 201, 403 to accept the session start request message. The session start request message may further comprise at least one of an adjusted session duration and an adjusted time to data transfer.

Step 1002

This step corresponds to step 306 in FIG. 3 and step 506 in FIG. 5. In some embodiments, the RAN node 201, 403 transmits a session start response message to the new first CN node 203b, 405b, 410b. The session start response message indicates if the session start request has been accepted by the RAN node 201, 403.

Figure 11:
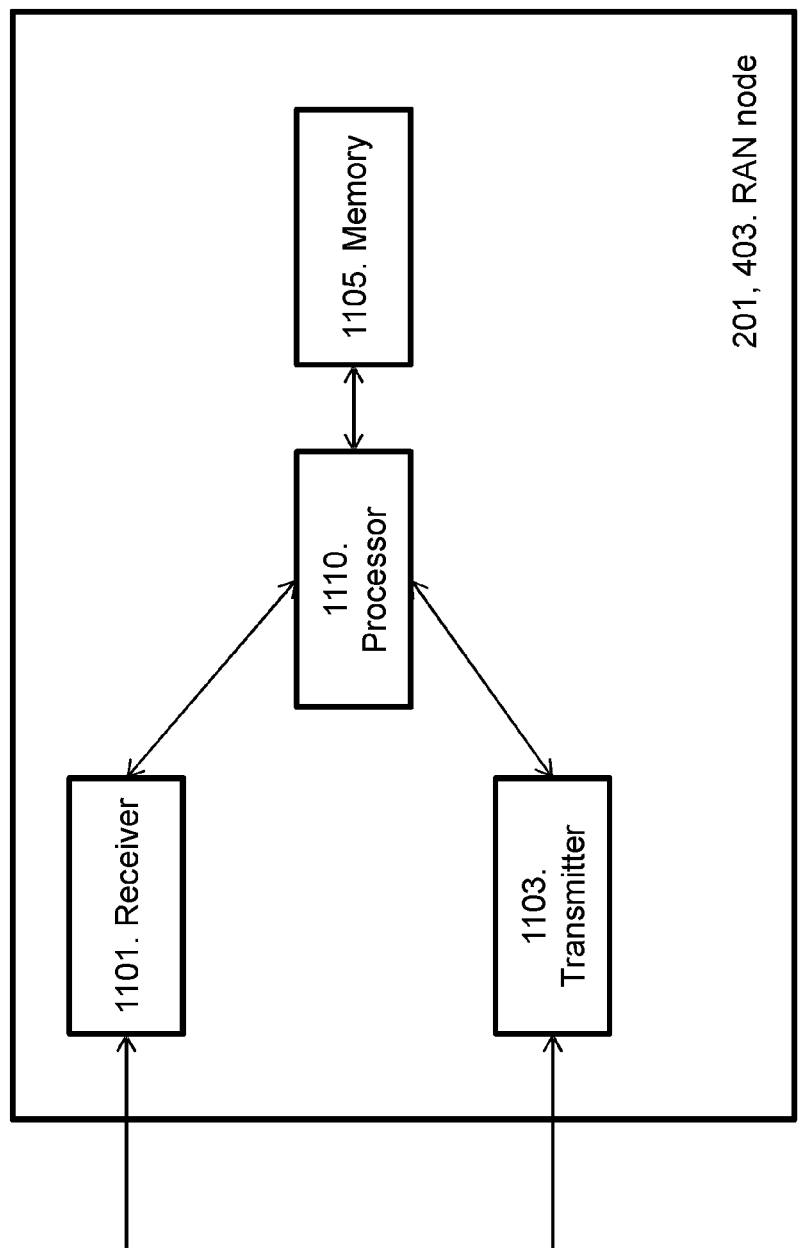
FIG. 11 is a schematic block diagram illustrating embodiments of a RAN node.

Embodiments of the RAN node 201, 403 adapted to perform the method actions for handling a failure in a communications network 200, as described above in relation to FIGS. 3, 5 and 6 is depicted in FIG. 11. The failure has caused a session between the second CN node 205 and the old first CN node 203a to become unavailable. The second CN node 205, 407 may be a MBMS-GW or a BM-SC. The new first CN node 203b, 405b, 410b may be one of a MME/SGSN and a MBMS-GW, and the old first CN node 203a may be one of a MME/SGSN and a MBMS-GW. The RAN node 201, 403 may be one of a RNC, a MCE and a BSC.

The RAN node 201, 403 is adapted to, e.g. by means of a receiver 1101, when the failure has been detected, receive a session start request message from the new first CN node 203b, 405b, 410b. As mentioned above, the session start request message is a request to restore the session, and the session start request message comprises a restoration flag indicating restoration of the session established before the failure and allowing the RAN node 201, 403 to accept the session start request message. The session start request message may further comprise at least one of an adjusted session duration and an adjusted time to data transfer. The failure may be related to a MME, a SGSN, a MBMS-GW, a SGmb path or a Sn/Sm path. The session may be one of a MBMS session and an eMBMS session. The receiver 1101 may also be referred to as a receiving module, a receiving means, a receiving unit, a receiving circuit, means for receiving or an input unit. The receiver 1101 may be a wireless receiver of the RAN node 201, 403 of a wireless or fixed communications system.

The RAN node 201, 403 may be further adapted to, e.g. by means of a transmitter 1103, transmit a session start response message to the new first CN node 203b, 405b, 410b. The session start response message may indicate if the session start request has been accepted by the RAN node 201, 403. The transmitter 1103 may also be referred to as a transmitting module, a transmitting means, a transmitting unit, a transmitting circuit, means for transmitting or an output unit. The transmitter 1103 may be a wireless transmitter of the RAN node 201, 403 of a wireless or fixed communications system.

The RAN node 201, 403 may further comprise a memory 1105 comprising one or more memory units. The memory 1105 is arranged to be used to store data, received data streams, the session start request messages, the session start response messages, restoration flag, the adjusted session duration, the adjusted time to transfer, the cause code, threshold values, time periods, configurations, schedulings, and applications to perform the methods herein when being executed in the RAN node 201, 403. The memory 1105 may also be referred to as a memory module, a storing means, a memory circuit or means for storing.

Those skilled in the art will also appreciate that the receiver 1101 and transmitter 1103 may refer to a combination of analog and digital circuits, and/or one or more processors configured with software and/or firmware, e.g. stored in a memory, that when executed by the one or more processors such as a processor 1110 perform as described below. In particular embodiments, some or all of the functionality described above as being provided by MME/SGSNs, MBMS-GWs or other forms of the RAN node 201, 403 may be provided by the processor 1110 executing instructions stored on a computer-readable medium, such as the memory 1105 shown in FIG. 11. Alternative embodiments of the RAN node 201, 403 may comprise additional components beyond those shown in FIG. 11 that may be responsible for providing certain aspects of the RAN node's functionality, comprising any of the functionality described above and/or any functionality necessary to support the embodiments described herein.

A computer program may comprise instructions which, when executed on at least one processor, e.g. such as the processor 1010, cause the at least one processor to carry out the method as described in relation to FIGS. 3, 5 and 10. A carrier may comprise the computer program, wherein the carrier is one of an electronic signal, optical signal, radio signal or computer readable storage medium.

In particular embodiments, some or all of the functionality described above as being provided by a mobile base station, a base station controller, a relay node, a NodeB, an eNodeB, a RNC, a MCE and/or any other type of mobile communications node may be provided by the processor 1110 executing instructions stored on a computer-readable medium, such as the memory 1105 shown in FIG. 11. Alternative embodiments of the RAN node 201, 403 may comprise additional components responsible for providing additional functionality, comprising any of the functionality identified above and/or any functionality necessary to support the solution described above.

The embodiments herein may be implemented through one or more processors, such as the processor 710 in the arrangement depicted in FIG. 7, the processor 910 in the arrangement depicted in FIG. 9 and the processor 1110 in the arrangement depicted in FIG. 11, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the CN node and/or RAN node. One such carrier may be in the form of a CD ROM disc. It is however feasible with other data carriers such as a memory stick. The computer program code may furthermore be provided as pure program code on a server and downloaded to at least one of the second CN node 205, 407, the new first CN node 203*b*, 405*b*, 410*b* and the RAN node 201, 403.

Although the described solutions may be implemented in any appropriate type of communications system supporting any suitable communication standards and using any suitable components, particular embodiments of the described solutions may be implemented in an example communications network 200, such as that illustrated in FIGS. 2 and 4 and described above.

The example communications network 200 may further comprise any additional elements suitable to support communication between wireless devices or between a wireless device and another communication device, such as a landline telephone. Although the illustrated CN nodes may represent a CN node that comprises any suitable combination of hardware and/or software, the second CN node 205, 407 may, in particular embodiments, represent a node such as the example second CN node 205, 407 illustrated in greater detail by FIG. 7, the new first CN node 203*b*, 405*b*, 410*b* may, in particular embodiments, represent a node such as the example new first CN node 203*b*, 405*b*, 410*b* illustrated in greater detail by FIG. 9. The CN node may be the old first CN node 203*a*, the new first CN node 203*b* or the second CN node 205. Similarly, although the illustrated RAN node may represent a RAN node that comprises any suitable combination of hardware and/or software, this RAN node may, in particular embodiments, represent a node such as the example RAN node 201, 403 illustrated in greater detail by FIG. 11.

The updated message in 3GPP TS 29.061 may be as below, where the amendments are underlined.

Message Format:

```
<RAR> ::= < Diameter Header: 258, REQ, PXY >
          < Session-Id >
          { Origin-Host }
          { Origin-Realm }
          { Destination-Realm }
          { Destination-Host }
          { Auth-Application-Id }
          { Re-Auth-Request-Type }
          [ Called-Station-Id ]
          [ Framed-IP-Address]
          [ Framed-IPv6-Prefix ]
          [ Framed-Interface-Id ]
              [ MBMS-Access-Indicator ]
              [ MBMS-StartStop-Indication ]
              [ MBMS-Service-Area ]
          [ QoS-Information ]
              [ MBMS-Session-Duration ]
              [ MBMS-Session-Identity ]
          [ MBMS-Session-Repetition-number ]
              [ TMGI ]
          *   [ 3GPP-SGSN-Address ]
          *   [ 3GPP-SGSN-IPv6-Address ]
          [ MBMS-Time-To-Data-Transfer ]
          [ MBMS-Data-Transfer-Start ]
          [ MBMS-Data-Transfer-Stop ]
          [ MBMS-User-Data-Mode-Indication ]
          [ MBMS-BMSC-SSM-IP-Address ]
          [ MBMS-BMSC-SSM-IPv6-Address ]
          [ MBMS-Flow-Identifier ]
              [ CN-IP-Multicast-Distribution ]
          [ MBMS-HC-Indicator ]
              [ MBMS-GW-UDP-Port-Indicator] ;
              for IP unicast encapsulated user data
              [ MBMS-GW-SSM-IP-Address ] ;
              for IP multicast encapsulated user data
              [ MBMS-GW-SSM-IPv6-Address ] ;
              for IP multicast encapsulated user data
              [ MBMS-BMSC-SSM-UDP-Port ] ;
              for IP multicast encapsulated user data
          [ Origin-State-Id ]
         *[ Proxy-Info ]
         *[ Route-Record ]
          [RestorationFlag]
              [AdjustedMBMS-Session-Duration]
              [AdjustedMBMS-Time-to-Data-Transfer]
```

The updated message and IE in 3GPP TS 29.274 and 3GPP TS 36.444 are described below in table 1, where the amendments are underlined.

TABLE 1

Information Elements in a MBMS Session Start Request (Sm)

| Information elements | P | Condition/Comment | IE Type | Ins. |
|---|---|---|---|---|
| Sender F-TEID for Control Plane | M | | F-TEID | 0 |
| Temporary Mobile Group Identity (TMGI) | M | | TMGI | 0 |
| MBMS Session Duration | M | | MBMS Session Duration | 0 |
| MBMS Service Area | M | | MBMS Service Area | 0 |
| MBMS Session Identifier | C | This IE shall be forwarded to MME/SGSN if it is provided by the BM-SC. | MBMS Session Identifier | 0 |
| MBMS Flow Identifier | C | This IE shall be forwarded to MME/SGSN if it is provided by the BM-SC. | MBMS Flow Identifier | 0 |
| QoS profile | M | See NOTE 1. | Bearer QoS | 0 |
| MBMS IP Multicast Distribution | M | | MBMS IP Multicast Distribution | 0 |
| Recovery | C | This IE shall be included if contacting the peer for the first time. | Recovery | 0 |
| MBMS Time to Data Transfer | CO | This IE shall be forwarded to MME/SGSN if it is received from the BM-SC. | MBMS Time to Data Transfer | 0 |
| <u>Adjusted MBMS Session Duration</u> | <u>CO</u> | <u>ThisIEshallbeincluded byMBMS-GWduringSm/Sn pathfailureasspecified in3GPPTS23.007.</u> | <u>MBMS Session Duration</u> | <u>0</u> |
| <u>Adjusted Timeto DataTransfer</u> | <u>CO</u> | <u>ThisIEshallbeincluded byMBMS-GWduringSm/Sn pathfailureasspecified in3GPPTS23.007.</u> | <u>MBMSTime toData Transfer</u> | <u>0</u> |
| <u>Restoration Flag</u> | <u>CO</u> | <u>ThisIEshallbeincluded byMBMS-GWduringSn/Sm pathfailureasspecified in3GPPTS23.007.</u> | | |

TABLE 1-continued

Information Elements in a MBMS Session Start Request (Sm)

| Information elements | P | Condition/Comment | IE Type | Ins. |
|---|---|---|---|---|
| Private Extension | O | | Private Extension | VS |

NOTE 1:
The MME shall ignore the ARP in this IE as specified in Section 6.3.2 of 3GPP TS 23.246 [37]. The uplink GBR and uplink MBR shall be ignored by MME/SGSN as specified in Section 20.5 of 3GPP TS 29.061 [38].

TABLE 2

Information Elements in a MBMS Session Start Request (M3)

| IE/Group Name | Presence | IE type and reference | Semantics description | Criticality | Assigned Criticality |
|---|---|---|---|---|---|
| Message Type | M | 9.2.1.1 | | YES | reject |
| MME MBMS M3AP ID | M | 9.2.3.2 | | YES | reject |
| TMGI | M | 9.2.3.3 | | YES | reject |
| MBMS Session Identity | O | 9.2.3.4 | | YES | ignore |
| MBMS E-RAB QoS parameters | M | 9.2.1.3 | | YES | reject |
| MBMS Session Duration | M | 9.2.3.5 | | YES | reject |
| MBMS Service Area | M | 9.2.3.6 | | YES | reject |
| Minimum Time to MBMS Data Transfer | M | 9.2.3.8 | | YES | reject |
| TNL Information | M | | | YES | reject |
| >IP Multicast Address | M | 9.2.2.1 | | — | |
| >IP Source Address | M | 9.2.2.1 | | — | |
| >GTP DL TEID | M | GTP TEID 9.2.2.2 | | — | |
| Time of MBMS Data Transfer | O | 9.2.3.9 | | YES | ignore |
| Adjusted MBMS Session Duration | C | 9.2.3.5 | | YES | reject |
| Adjusted TimetoData Transfer | C | 9.2.3.8 | 0 | YES | reject |
| Restoration Flag | C | X | | YES | ignore |

And a new GTP cause code: "TMGI in Use and overlapping MBMS Service Area"

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear.

The invention claimed is:

1. A method for handling a failure in a communications network, the method comprising:
   a first Core Network (CN) node transmitting a session start request to a second CN node;
   receiving, at the first CN node, a session start response transmitted by the second CN node;
   the first CN node detecting a failure in communication between the first CN node and the second CN node;
   as a result of the detected failure, the first CN node transmitting a session restoration message to a third CN node,
   wherein the session restoration message comprises a restoration flag that: (i) indicates restoration of the session established before the failure and, (ii) allows a Radio Access Network, RAN, node in the communications network to accept the session restoration message.

2. The method according to claim 1, further comprising:
   receiving, at the first CN node, a session restoration response message from the third CN node, wherein the session restoration response indicates that the failure has been restored by setting up a session with the third CN node instead of the second CN node.

3. The method according to claim 1, wherein the session restoration message further comprises at least one of an adjusted session duration and an adjusted time to data transfer.

4. The method according to claim 1, wherein the failure is related to a Mobility Management Entity, MME, a Serving General packet radio service Support Node, SGSN, a Multimedia Broadcast Multicast Services-GateWay, MBMS-GW, a SGmb path or a Sn/Sm path.

5. The method according to claim 1, wherein the session is one of:
   a Multimedia Broadcast Multicast Services, MBMS, session and an evolved MBMS, eMBMS, session.

6. The method according to claim 1, wherein the first CN node is a Multimedia Broadcast Multicast Services-GateWay, MBMS-GW or a Broadcast and Multicast-Service Centre, BM-SC.

7. The method according to claim 1, wherein the third CN node is a one of a Mobility Management Entity/Serving General packet radio service Support Node, MME/SGSN and a Multimedia Broadcast Multicast Services-GateWay, MBMS-GW; and
   wherein the second CN node is one of a MME/SGSN and a MBMS-GW respectively.

8. The method according to claim 1, wherein the RAN node is one of a Radio Network Controller, RNC, a Multi-cell/multicast Coordination Entity, MCE, and a Base Station Controller, BSC.

9. A computer program product comprising a non-transitory computer readable medium storing program code which, when executed on at least one processor, cause the at least one processor to carry out the method according to claim 1.

10. A method for handling a failure in a communications network, the method comprising:
    receiving, at a first Core Network (CN) node, a session restoration message from a second CN node,
    wherein the session restoration message comprises a restoration flag that: (i) indicates restoration of a session established before a detected communication failure, and (ii) allows a Radio Access Network, RAN, node to accept the session restoration message; and transmitting the session restoration message to the RAN node.

11. The method according to claim 10, further comprising:

receiving a session restoration response message from the RAN node, wherein the session restoration response message indicates if the session restoration message has been accepted by the RAN node; and the first CN node transmitting the session restoration response message to the second CN node.

12. The method according to claim 10, wherein the session restoration message further comprises at least one of an adjusted session duration and an adjusted time to data transfer.

13. The method according to claim 10, wherein the detected communication failure is related to a Mobility Management Entity, MME, a Serving General packet radio service Support Node, SGSN, a Multimedia Broadcast Multicast Services-GateWay, MBMS-GW, a SGmb path or a Sn/Sm path.

14. The method according to claim 10, wherein the session is one of: a Multimedia Broadcast Multicast Services, MBMS, session and an evolved MBMS, eMBMS, session.

15. The method according to claim 10, wherein the second CN node is one of a Multimedia Broadcast Multicast Services-GateWay, MBMS-GW, and a Broadcast and Multicast-Service Centre, BM-SC.

16. The method according to claim 10, wherein the first CN node is a one of a Mobility Management Entity/Serving General packet radio service Support Node, MME/SGSN and a Multimedia Broadcast Multicast Services-GateWay, MBMS-GW.

17. The method according to claim 10, wherein the RAN node is one of a Radio Network Controller, RNC, a Multi-cell/multicast Coordination Entity, MCE, a Base Station Controller, BSC.

18. A computer program product comprising a non-transitory computer readable storage medium storing program code which, when executed on at least one processor, cause the at least one processor to carry out the method according to claim 10.

19. A method for handling a failure in a communications network, the method comprising:

receiving, at a Radio Access Network (RAN) node, a session restoration message from a first CN node, wherein the session restoration message comprises a restoration flag that: (i) indicates restoration of a session established before a detected communication failure, and (ii) allows the RAN node to accept the session restoration message.

20. The method according to claim 19, further comprising:

transmitting a session restoration response message to the first CN node, wherein the session restoration response message indicates if the session restoration message has been accepted by the RAN node.

21. The method according to claim 19, wherein the session restoration message further comprises at least one of an adjusted session duration and an adjusted time to data transfer.

22. The method according to claim 19, wherein the detected communication failure is related to a Mobility Management Entity, MME, a Serving General packet radio service Support Node, SGSN, a Multimedia Broadcast Multicast Services-GateWay, MBMS-GW, a SGmb path or a Sn/Sm path.

23. The method according to claim 19, wherein the session is one of: a Multimedia Broadcast Multicast Services, MBMS, session and an evolved MBMS, eMBMS, session.

24. The method according to claim 19, wherein the first CN node is a one of a Mobility Management Entity/Serving General packet radio service Support Node, MME/SGSN and a Multimedia Broadcast Multicast Services-GateWay, MBMS-GW.

25. The method according to claim 19, wherein the RAN node is one of a Radio Network Controller, RNC, a Multi-cell/multicast Coordination Entity, MCE, and a Base Station Controller, BSC.

26. A computer program product comprising a non-transitory computer readable medium storing computer program code which, when executed on at least one processor, cause the at least one processor to carry out the method according to claim 19.

27. A first Core Network (CN) node for handling a failure in a communications network, wherein the first CN node comprises:

a transmitter;
a receiver;
memory;
a processor coupled to the memory, wherein the processor is configured to:

employ the transmitter to transmit a session start request to a second CN node;

receiving, at the first CN node, a session start response transmitted by the second CN node;

detect a failure in communication between the first CN node and the second CN node;

as a result of the detected failure, employ the transmitter to transmit a session restoration message to a third CN node, wherein the session restoration message comprises a restoration flag that: (i) indicates restoration of the session established before the failure and, (ii) allows a Radio Access Network, RAN, node in the communications network to accept the session restoration message.

28. The first CN node according to claim 27, the processor further configured to:

employ the receiver to receive a session restoration message from the third CN node, wherein the session restoration response indicates that the failure has been restored by setting up a session with the third CN node instead of the second CN node.

29. The first CN node according to claim 27, wherein the session restoration message further comprises at least one of an adjusted session duration and an adjusted time to data transfer.

30. The first CN node according to claim 27, wherein the failure is related to a Mobility Management Entity, MME, a Serving General packet radio service Support Node, SGSN, a Multimedia Broadcast Multicast Services-GateWay, MBMS-GW, a SGmb path or a Sn/Sm path.

31. The first CN node according to claim 27, wherein the session is one of: a Multimedia Broadcast Multicast Services, MBMS, session and an evolved MBMS, eMBMS, session.

32. The first CN node according to claim 27, wherein the first CN node is a Multimedia Broadcast Multicast Services-GateWay, MBMS-GW or a Broadcast and Multicast Service Centre, BMSC.

33. The first CN node according to claim 27, wherein the third CN node is a one of a Mobility Management Entity/ Serving General packet radio service Support Node, MME/SGSN and a Multimedia Broadcast Multicast Services-GateWay, MBMS-GW; and
   wherein the second CN node is one of a MME/SGSN and a MBMS-GW.

34. The first CN node according to claim 27, wherein the RAN node is one of a Radio Network Controller, RNC, a Multi-cell/multicast Coordination Entity, MCE, and a Base Station Controller, BSC.

35. A first Core Network (CN) node, for handling a failure in a communications network, wherein the first CN node comprises:
   a receiver;
   a transmitter;
   memory;
   a processor coupled to the memory, wherein the processor is configured to:
      employ the receiver to receive a session restoration message from a second CN node, wherein the session restoration message comprises a restoration flag that: (i) indicates restoration of a session established before a detected communication failure and (ii) allows a Radio Access Network, RAN, node to accept the session restoration message, and
   employ the transmitter to transmit the session restoration message to the RAN node.

36. The first CN node according to claim 35, to the processor further configured to:
   employ the receiver to receive a session restoration response message from the RAN node, wherein the session restoration response message indicates if the session restoration request message has been accepted by the RAN node; and to
   employ the transmitter to transmit the session restoration response message to the second CN node.

37. The first CN node according to claim 35, wherein the session restoration message further comprises at least one of an adjusted session duration and an adjusted time to data transfer.

38. The first CN node according to claim 35, wherein the detected communication failure is related to a Mobility Management Entity, MME, a Serving General packet radio service Support Node, SGSN, a Multimedia Broadcast Multicast Services-GateWay, MBMS-GW, a SGmb path or a Sn/Sm path.

39. The first CN node according to claim 35, wherein the session is one of: a Multimedia Broadcast Multicast Services, MBMS, session and an evolved MBMS, eMBMS, session.

40. The first CN node according to claim 35, wherein the second CN node is one of a Multimedia Broadcast Multicast Services-GateWay, MBMS-GW, and a Broadcast and Multicast-Service Centre, BM-SC.

41. The first CN node according to claim 35, wherein the first CN node is a one of a Mobility Management Entity/ Serving General packet radio service Support Node, MME/SGSN and a Multimedia Broadcast Multicast Services-GateWay, MBMS-GW.

42. The first CN node according to claim 35, wherein the RAN node is one of a Radio Network Controller, RNC, a Multi-cell/multicast Coordination Entity, MCE, and a Base Station Controller, BSC.

43. A Radio Access Network, RAN, node, for handling a failure in a communications network, wherein the RAN node comprising:
   a receiver;
   a transmitter;
   memory;
   a processor coupled to the memory, wherein the processor configured to:
      employ the receiver to receive a session restoration message from a first CN node,
      wherein the session restoration message comprises a restoration flag that: (i) indicates restoration a session established before a detected communication failure, and (ii) allows the RAN node to accept the session restoration message.

44. The RAN node according to claim 43, to the processor further configured to:
   employ the transmitter to transmit a session restoration message to the first CN node, wherein the session restoration response message indicates if the session restoration message has been accepted by the RAN node.

45. The RAN node according to claim 43, wherein the session restoration message further comprises at least one of an adjusted session duration and an adjusted time to data transfer.

46. The RAN node according to claim 43, wherein the detected communication failure is related to a Mobility Management Entity, MME, a Serving General packet radio service Support Node, SGSN, a Multimedia Broadcast Multicast Services-GateWay, MBMS-GW, a SGmb path or a Sn/Sm path.

47. The RAN node according to claim 43, wherein the session is one of: a Multimedia Broadcast Multicast Services, MBMS, session and an evolved MBMS, eMBMS, session.

48. The RAN node according to claim 43, wherein the first CN node is a one of a Mobility Management Entity/ Serving General packet radio service Support Node, MME/SGSN and a Multimedia Broadcast Multicast Services-GateWay, MBMS-GW.

49. The RAN node according to claim 43, wherein the RAN node is one of a Radio Network Controller, RNC, a Multi-cell/multicast Coordination Entity, MCE, and a Base Station Controller, BSC.

* * * * *